US006878333B1

(12) United States Patent
Yokoyma et al.

(10) Patent No.: US 6,878,333 B1
(45) Date of Patent: Apr. 12, 2005

(54) BARRIER RIB FORMATION ON SUBSTRATE FOR PLASMA DISPLAY PANELS AND MOLD THEREFOR

(75) Inventors: Chikaumi Yokoyma, Zama (JP); Takaki Sugimoto, Komae (JP); Akira Yoda, Machida (JP)

(73) Assignee: 3M Innovative Properties Company, St. Paul, MN (US)

( * ) Notice: Subject to any disclaimer, the term of this patent is extended or adjusted under 35 U.S.C. 154(b) by 276 days.

(21) Appl. No.: 10/069,175

(22) PCT Filed: Aug. 29, 2000

(86) PCT No.: PCT/US00/23704

§ 371 (c)(1), (2), (4) Date: Feb. 21, 2002

(87) PCT Pub. No.: WO01/20636

PCT Pub. Date: Mar. 22, 2001

(30) Foreign Application Priority Data

Sep. 13, 1999 (JP) .......................................... 11-259318

(51) Int. Cl.[7] ................................................ B29C 35/08

(52) U.S. Cl. ......................... 264/494; 264/496; 264/19; 264/20; 445/24

(58) Field of Search .............................. 264/494, 496.2, 264/19, 220; 445/24

(56) References Cited

U.S. PATENT DOCUMENTS

| | | | | |
|---|---|---|---|---|
| 4,975,104 | A | 12/1990 | Kim | |
| 5,037,723 | A | 8/1991 | Hwang | |
| 5,116,704 | A | 5/1992 | Kwon | |
| 5,136,207 | A | 8/1992 | Miyake et al. | |
| 5,152,917 | A | 10/1992 | Pieper et al. | |
| 5,209,688 | A | 5/1993 | Nishigaki et al. | |
| 5,268,233 | A | 12/1993 | Heller et al. | |
| 5,342,563 | A | 8/1994 | Quinn et al. | |
| 5,352,478 | A | 10/1994 | Miyake et al. | |
| 5,484,314 | A | 1/1996 | Farnworth | |
| 5,580,511 | A | 12/1996 | Sakai et al. | |
| 5,601,468 | A | 2/1997 | Fujii et al. | |
| 5,658,832 | A | 8/1997 | Bernhardt et al. | |
| 5,703,433 | A | 12/1997 | Fujii et al. | |
| 5,747,931 | A | 5/1998 | Riddle et al. | |
| 5,814,267 | A | 9/1998 | Sakai et al. | |
| 5,853,446 | A | 12/1998 | Carre et al. | |
| 6,156,433 | A | * 12/2000 | Hatori et al. | 428/411.1 |

FOREIGN PATENT DOCUMENTS

| | | |
|---|---|---|
| EP | 0196033 | 10/1986 |
| EP | 0837486 | 4/1998 |
| EP | 0935275 | 8/1999 |
| FR | 2738393 | 3/1997 |
| FR | 2764438 | 11/1998 |

(Continued)

*Primary Examiner*—Laura Edwards
*Assistant Examiner*—Michelle Lazor
(74) *Attorney, Agent, or Firm*—Carolyn A. Fischer

(57) ABSTRACT

A method of producing a substrate (12) for a plasma display panel, which comprises the steps of: contacting a rib precursor composition (32) containing a first photo-setting initiator having a first absorption edge and a first photo-setting component, closely with a base (12); filling a mold (30), obtained by photo-setting of a second photo-setting component in a presence of a second photo-setting initiator having a second absorption edge whose wavelength is shorter than that corresponding to the first absorption edge of the first photo-setting initiator, with the rib precursor composition (32); irradiating the rib precursor composition (32) with light having a wavelength longer than that corresponding to the second absorption edge to set the rib precursor composition (32), thereby forming a rib (34) on the base (12); and removing the mold (30) from the resulting base (12) on which the rib (34) is formed.

4 Claims, 3 Drawing Sheets

FOREIGN PATENT DOCUMENTS

| | | |
|---|---|---|
| JP | 1137534 | 5/1989 |
| JP | 354569 | 3/1991 |
| JP | 8321258 | 12/1996 |
| JP | 912336 | 1/1997 |
| JP | 9134676 | 5/1997 |
| JP | 10134705 | 5/1997 |
| JP | 09147751 | 6/1997 |
| JP | 10/326571 | 12/1998 |
| JP | 11135025 | 5/1999 |
| JP | 11339668 | 12/1999 |
| JP | 200021303 | 1/2000 |
| WO | WO 00/58990 | 10/2000 |

* cited by examiner

BARRIER RIB FORMATION ON SUBSTRATE FOR PLASMA DISPLAY PANELS AND MOLD THEREFOR

CROSS REFERENCE TO RELATED APPLICATIONS

This application claims priority from Japan Application No. 11-259318, filed Sep. 13, 1999.

FIELD OF UTILIZATION IN INDUSTRY

The present invention relates to a method of producing a substrate for plasma display panels (hereinafter also referred to as "PDP", merely) and a mold used in the method.

RELATED ART

PDP is expected to be used as a thin large-image display device. Generally, PDP is equipped with a so-called substrate for PDP. Typical substrate for PDP is composed of a pair of glass flat plates facing each other at a distance via a rib having a predetermined dimension (also referred to as a barrier rib, partition or barrier). In this case, such a rib separates space between a pair of glass plates into cells in an air-tight manner to form a plurality of discharge display cells capable of containing a discharge gas such as neon, helium or xenon.

Various suggestions have been made to produce and provide the rib. For example, a method of using a mold is known. Generally, according to this method, a liquid molding material filled in the mold is converted into a molded article capable of transferring to a plate-shaped base by a thermal or optical action. On removing the mold from the rib, the rib is produced and provided, nearly continuously, with comparatively high accuracy.

In the case of a general substrate for PDP, for example, a base and a rib made of glass or ceramic are used. On the other hand, a mold for a typical substrate for PDP is made of a metal, glass or ceramic as disclosed, for example, in Unexamined Patent Publication (KOKAI) No. 9-12336. Accordingly, the base and rib have almost the same hardness as or lower than that of the mold. As a result, when the mold is removed from the rib, there is a fear of causing breakage of the base or rib, or breakage of the mold itself Such severe breakage often occurs when the rib is press-molded by using a mold made of glass, ceramic or metal as disclosed in Unexamined Patent Publication (KOKAI) No. 9-283017. The mold is repeatedly used for mass production. It is not preferred to leave the broken rib in the mold, since it is necessary to wash the mold every time the rib is made, thereby lowering the productivity.

Unexamined Patent Publication (KOKA1) No. 9-134676 also discloses that a mold made of a silicone resin having a hardness lower than that of glass or ceramic is used. However, the silicone resin is generally brittle. Accordingly, it can not be expected to repeatedly use the mold made of the silicone resin for mass production.

SUMMARY OF THE INVENTION

Figure 1:
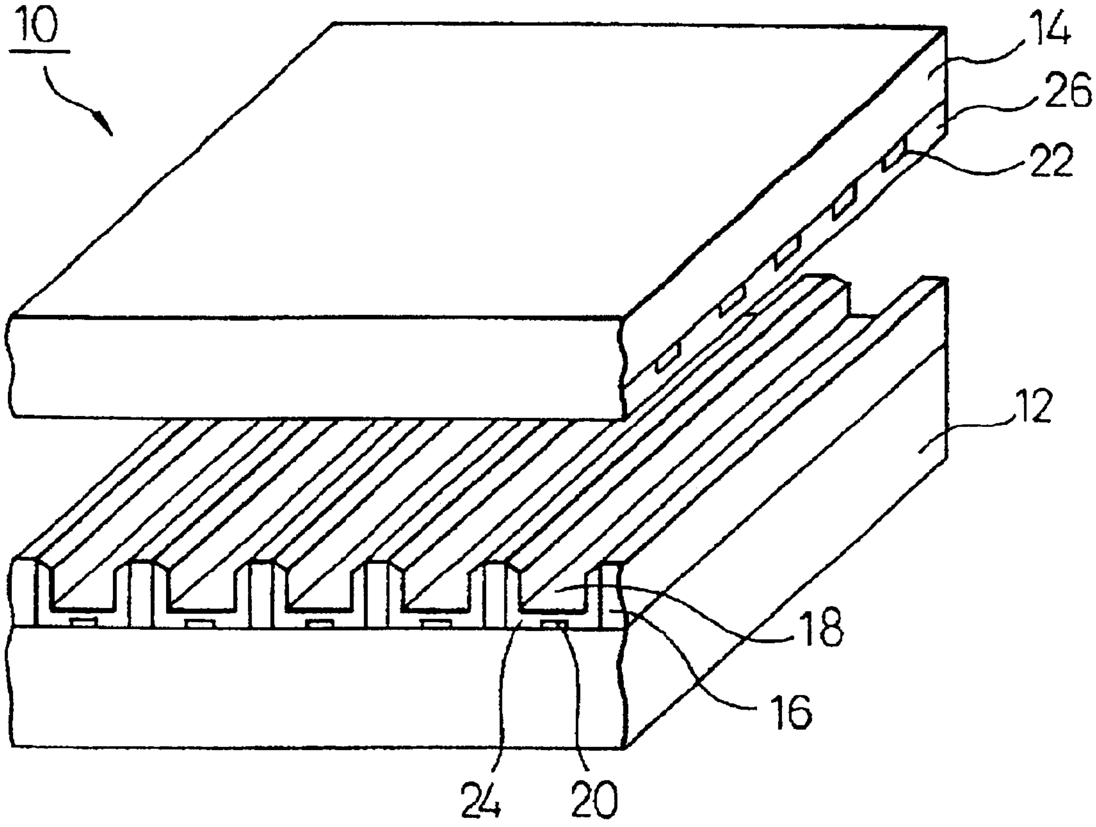
FIG. 1 is a partially exploded perspective view showing one embodiment of the substrate for PDP.

It is an object of the present invention to provide a method of producing a substrate for PDP, capable of repeatedly using a mold with avoiding breakage of a base or a rib, and a mold used in the method.

According to the present invention, there is provided a method of producing a substrate for a plasma display panel, which comprises the steps of:

contacting a rib precursor composition containing a first photo-setting initiator having a first absorption edge and a first photo-setting component closely with a base;

filling a mold, obtained by photo-setting of a second photo-setting component in the presence of a second photo-setting initiator having a second absorption edge whose wavelength is shorter than that corresponding to the first absorption edge of the first photo-setting initiator, with the rib precursor composition;

irradiating the rib precursor composition with light having a wavelength longer than that corresponding to the second absorption edge to set the rib precursor composition, thereby forming a rib on the base; and removing the mold from the resulting base on which the rib is formed.

Either step of contacting the rib precursor composition closely with the base or the step of filling with the rib precursor composition may be conducted first. That is, after the mold is filled with the rib precursor composition, the base may be contacted with them.

According to the present invention, there is also provided a mold for a substrate for a plasma display panel, comprising a base and a rib formed from a rib precursor composition containing a first photo-setting initiator having a first absorption edge and a first photo-setting component, which is provided on the base, wherein the mold is obtained by photo-setting of a second photo-setting component in the presence of a second photo-setting initiator having a second absorption edge whose wavelength is shorter than that corresponding to the first absorption edge of the first photo-setting initiator.

There is further provided the above method, which further comprises the step of irradiating the rib precursor composition filled in the mold at the peripheral portion of the base with light-having a wavelength shorter than that corresponding to the second absorption edge, thereby setting the rib precursor composition. According to such a method, as described in detail below, the rib molded article is adhered to the mold by the photosetting reaction between the unreacted secondary setting component in the mold and the first setting component in the rib precursor composition, thereby removing the rib molded article at the peripheral portion of the base, together with the mold, and therefore a step of removing the rib molded article at the peripheral portion of the base is not required.

The term "absorption edge" used in the present specification refers to a wavelength portion wherein an absorbency in a continuous light absorption spectrum of an object drastically decreases and it becomes substantially transparent when the wavelength becomes longer than said wavelength.

DETAILED DESCRIPTION

The present invention will be described by way of the following embodiments but is not limited thereto, as is apparent to a person with ordinary skill. In the drawings, the same reference numeral is applied to the same or equivalent portion.

In a partially exploded perspective view of FIG. 1, one embodiment of the substrate for PDP according to the present invention is schematically shown. This substrate 10 for PDP is used for so-called ac. PDP, but is not limited thereto and can also be applied to the substrate for d.c. PDP. The substrate 10 for PDP is preferably equipped with transparent flat plates made of easily available soda-lime glass, which are facing each other at a distance, i.e. a back plate 12 and a front plate 14. Between the back plate 12 and front plate 14, plural ribs 16 having a predetermined dimension are provided to separate the space between the plates into cells, thereby making it possible to form a plurality of discharge display cells 18.

The rib 16 shown in the figure is formed from a photosensitive paste 32 (rib precursor composition). Preferable photosensitive paste contains a first photo-setting component as a binder component, a photo-setting initiator having a first absorption edge and a ceramic powder and, if necessary, a glass powder. The ceramic powder is used for affording a constant shape to the rib, and is preferably made of alumina, silica, titania or wollnite (wollastonite) having high strength.

The first photo-setting component is photopolymerized in the presence of the photo-setting initiator having a first absorption edge, thereby making it possible to retain the shape of the rib 16. The first photo-setting component is not specifically limited, but is preferably an acrylic resin. The acrylic resin is formed, for example, from an acrylic monomer or oligomer, or a silane coupling agent having a methacryl group. As the acrylic monomer or oligomer, for example, monomers or oligomers, such as HEMA (hydroxyethyl methacrylate), BEA (hydroxyethyl acrylate), BisGMA (bisphenol A diglycidyl ether methacrylate), triethylene glycol dimethacrylate, etc. are particularly preferably used.

Particularly, when the first photo-setting component is made of a silane coupling agent having a methacryl group, a network is formed by photopolymerization of the methacryl group, thereby making it possible to retain and contain the ceramic powder. In addition, the first photo-setting component of the silane coupling agent forms polymeric silicon dioxide having a high melting point by calcination. This network due to the silane coupling agent is substantially retained by silicon dioxide even at comparatively high temperature after calcination, thereby making it possible to retain the ceramic powder or glass powder. Such a silane coupling agent is preferably γ-methacryloxypropylmethyltrimethoxysilane, γ-methacryloxypropylmethyldimethoxysilane, γ-methacryloxypropyltriethoxysilane or γ-methacryloxypropylmethyldiethoxysilane having a molecular weight of 232 to 290 in view of availability.

The glass powder is used to enhance the strength by affording a dense structure to the rib. Basically, the glass powder is used in the amount enough to fill small space between the network made of silicon dioxide and the ceramic powder surrounded with the network. When the network does not exist, it is not necessary that the glass powder does not fill large space between ceramic powders. As a result, the strength of the rib can be increased by a comparatively small amount of the glass powder. For example, even if the glass powder exclusively contains lead having high mass adsorption coefficient, the rate of photo-setting is hardly influenced. Use of the glass powder made of expensive glass having a low melting point can also be inhibited. Basically, the glass powder is contained in the amount of 10 to 70% by volume. Preferably, the glass powder is contained in the amount of 20 to 50% by volume, thereby further increasing the strength of the rib., When this network is heated, together with the glass powder, the network is retained as far as silicon dioxide constituting it does not reach the melting point of silicon dioxide, thereby to cause substantially no change in volume. If any change in volume arises, the degree is small.

When the front plate 14 or back plate 12 is, for example, made of glass having an annealing point of 550° C., the glass powder preferably has a softening point of 450–550° C. which is lower than the annealing point of the plate. Because even if the glass powder having such a softening point is heated together with the front plate or back plate of glass to flow into a gap, a thermal deformation of the front plate 14 or back plate 12 can be prevented. The glass powder is basically made of lead glass aluminum phosphate glass, boron-titanium glass, bismuth glass or zinc glass containing boron, zinc, phosphoric acid, lead, titanium or a combination thereof. In order to reduce the time of photo-setting of the rib precursor composition without taking high mass absorption coefficient into consideration, boron, zinc, phosphoric acid, titanium or a combination thereof is preferably contained. In this case, each composition is not specifically limited. However, the glass powder preferably has a softening point higher than that of a calcination temperature of the first setting component. When using the glass powder having such a softening point, the glass powder is not melted prior to removal of the first setting component due to calcination. Accordingly, a fear of residue of the first setting component can be avoided by surrounding the first setting component with the glass component.

If necessary, an oxidizing catalyst may be contained in the photosensitive paste 32. The oxidizing catalyst is commonly made of an oxide, salt or complex of chromium (Cr), manganese (Mn), iron (Fe), cobalt (Co), nickel (Ni), copper (Cu), zinc (Zn), indium (In) or tin (Sn), ruthenium (Ru), rhodium (Rh), palladium (Pd), silver (Ag), iridium (Ir), platinum (Pt), gold (Au) or cerium (Ce), and can reduce energy required to calcine the first photo-setting component. Describing in detail, when this calcination temperature is decreased by 50–90° C. from about 500–550° C., the first photo-setting component causing gas evolution, which is undesirable for plasma discharge, can be removed completely from the rib at comparatively low temperature. In particular, when it is required that the glass powder has a softening point higher than a calcination temperature of the first photo-setting component as described above, a minimum softening point required to the glass powder is lowered by decreasing the calcination temperature using the oxidizing catalyst. As a result, the selectivity of the glass component is increased.

Such a decrease in calcination temperature can effectively inhibit thermal deformation (e.g. warpage, deflection or shrinkage) of the glass plate.

It has been known that, in cases where a glass plate having a width of 5 mm and a thickness of 2.8 mm is formed of soda-lime glass, which is available easily, the amount of deflection is 25 and 5 im at 550 and 500° C., respectively, while deflection hardly occurs at 460° C. when a load of 137 g is applied to the glass plate. It has also been known that the amount of isotropic thermal shrinkage of the glass plate becomes 400, 225 or 125 ppm at 550, 500 or 460° C., respectively.

It has also been well known that, in case where the above glass plate is formed of glass having high distortion point, which is commercially available from Asahi Glass Co. under the trade name of PD200, the amount of isotropic thermal shrinkage of the glass plate becomes 220 ppm, 75 ppm and 30 ppm at 550, 500 and 460° C., respectively.

When the oxidizing catalyst is absent, the first photo-setting component can be removed at the calcination temperature of at least about 500° C. However, when the calcination temperature was decreased by 50–90° C. by using the oxidizing catalyst as described above, such deflection and thermal shrinkage are reduced.

In each discharge display cell 18, an address electrode 20 is provided on a back plate 12 along a rib 16. On a front plate 14, a transparent bus electrode 22 made of an indium tin oxide (ITO) is provided perpendicular to the rib 16. In addition, a discharge gas such as neon, helium, xenone or the like is contained between the address electrode 20 and bus electrode 22, thereby making it possible to emit light by discharge. On each address electrode 20, a fluorescent layer 24, (e.g., a phosphor) is provided in a predetermined order, thereby making it possible to perform color display. On the front plate 14 and bus electrode 22, a transparent dielectric layer 26 is provided to coat the bus electrode 22, thereby making it possible to extend life of PDP by inhibition of sputtering of the bus electrode 22 during operation of the device.

With reference to a flow sheet showing the steps of the production of the substrate for PDP shown in FIG. 2, formation of a rib and an apparatus therefor will be described in detail below.

Figure 2A:
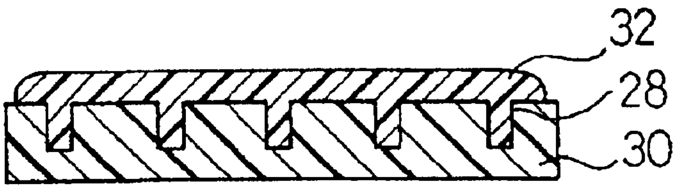
FIGS. 2A–2E provide a flow sheet showing the first embodiment of the method of producing the substrate for PDP according to the present invention.

First, a mold 30 having a concave portion 28 corresponding to the shape of a rib is prepared (see FIG. 2(A)). Not shown in the drawing, the concave portion 28 may have a section in the shape of trapezoid. Also not shown in the drawing, releasability may also be imparted to the mold by coating the surface of the concave portion with a releasing agent.

This mold 30 can be obtained by photo-setting of a second photo-setting component in the presence of a second photo-setting initiator having a second absorption edge. As the second photo-setting component, an acrylic monomer or oligomer can be used. Specifically, as the acrylic monomer or oligomer, an aliphatic urethane acrylate, which is commercially available from Henschel Co under the trade name of "Photomer 6010", 1,6-hexanediol diacrylate commercially available from Shin-Nakamura Chemical Co. can be preferably used. Since the mold is molded by photopolymerization, cutting of the resulting mold 30 is not required. Since photopolymerization proceeds comparatively quickly, the mold 30 can be easily obtained in a short time.

Since such a mold 30 has a hardness lower than that of general glass or ceramic, breakage of the rib and base can be avoided in case of removing the mold from the substrate. As a result, the mold can be repeatedly used without being washed.

As mentioned above, photopolymerization of the second photo-setting component is conducted in the presence of the second photo-setting initiator having a second absorption edge whose wavelength is shorter than that corresponding to the second absorption edge of the first photo-setting initiator. Such a second photo-setting initiator can not absorb light whose wavelength is longer than that corresponding to the second absorption edge, while a first photo-setting initiator can absorb it. As a result, when the rib precursor composition is set by light having a wavelength longer than that corresponding to the second absorption edge, only the first photo-setting component is set by photopolymerization, thereby making it possible to avoid simultaneous photopolymerization of the second photo-setting component, even if unreacted second photo-setting component remains in the mold 30. Preferable photo-setting initiator includes, for example, aminoketone (400–430 nm), bisacylphosphine oxide (440 nm), camphorquinone (500 nm), metallocene hydroxyketone (500 nm) and benzyl dimethyl ketal (380 nm), which are commercially available from Ciba Geigy Co. under the trade name of Irpacure 2959 (370 nm), Irgacure 184 (380 nm), Darocure 1173 (380 nm), Irgacure 500 (380 nm), Irgacure 1000 (380 nm), Irgacure 651 (390 nm), Irgacure 907 (400 nm), Irgacure 149 (420 nm), Irgacure 1700 (440 nm), Irgacure 1850 (440 nm), Irgacure 819 (450 nm), Irgacure 369 (480 nm) and Irgacure 784 (500 nm). According to the present invention, selection of the first photo-setting initiator and second photo-setting initiator is made by properly selecting two kinds of photo-setting initiators having different absorption edges described above. A combination of the first photo-setting initiator and second photo-setting initiator includes, for example, Darocure 1173 having an absorption edge corresponding to a wavelength of 380 nm and Irgacure 819 having an absorption edge corresponding to a wavelength of 440 to 450 nm, Irgacure 1700 and Irgacure 1850, etc.

Figure 2B:
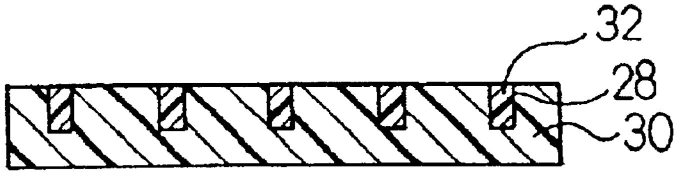

Then, a photosensitive paste 32 is coated on the mold 30 with filling the concave portion 28 with it (see FIG. 2(B)). The photosensitive paste 32 preferably has a viscosity of $1\times10^3$ to $1\times10^5$ cps. By using the viscosity within such a range, filling of the photosensitive paste can be conducted with high accuracy. A surfactant may also be added to adjust the viscosity of the paste. Preferred surfactant includes, for example, lauryl betain, polyoxyethylene sorbitan monolaurate, polyoxyethylene octyl phenyl ether, polyoxyethylene nonyl phenyl ether and phosphate alkyl polyol, and these surfactants are commercially available from Kao Corp. under the trade name of Ambitol 24B, Reodol TW-L-106, Emulgen 840S and Emulgen 909, and commercially available from Imation Co. under the trade name of POCAII.

The photosensitive paste containing a silane coupling agent as the first photo-setting component may contain a mineral acid such as hydrochloric acid, nitric acid or the like to hydrolyze the silane coupling agent, thereby providing a photosensitive paste in the form of a sol. Such a photosensitive paste is not gelled by drying, thereby making it possible to disperse the ceramic powder and ceramic powder. Furthermore, the viscosity does not depend on the amount of water.

Figure 2C:
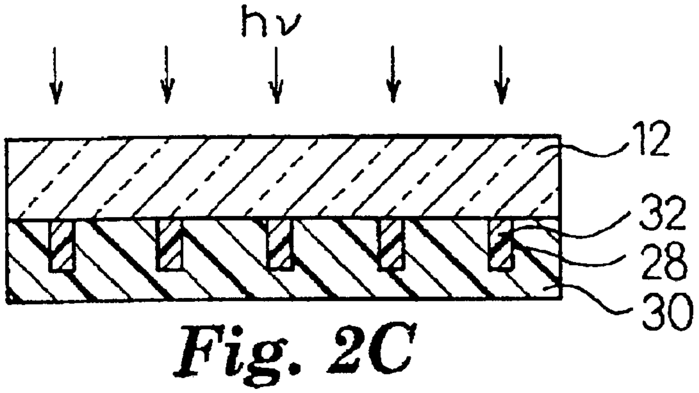

Then, a back plate 12 is contacted with the photosensitive paste 32 (see FIG. 2(C)). The second photo-setting component mentioned above can impart flexibility to the mold 30 on photopolymerization. In such case, the mold 30 is contacted with the photosensitive paste 32 from one end by deflecting the mold. Accordingly, any air between the back plate 12 and the photosensitive paste 32 is efficiently removed out to the exterior and invasion of the air into the photosensitive paste 32 is also avoided. Alternatively, first, the photosensitive paste 32 is coated on the back plate 12 and then the mold 30 is laminated with being deflected, thereby filling the space between the concave portion 28 and the back plate 12 with the photosensitive paste 32. Again in this case, any air is efficiently removed out to the exterior and invasion of the air into the photosensitive paste 32 is also avoided. Furthermore, an antifoamer can also be added to prevent defects of the rib due to bubbles. Examples of the antifoamer include Dappo SN manufactured by Sunnopco Co. The antifoamer can be used in the amount of 1–5% based on the weight of the first setting component.

Then, the first photo-setting component is polymerized by irradiating the photosensitive paste 32 with light (hv) having a wavelength longer than that of the second absorption edge of the second photo-setting component, thereby obtaining a rib molded article 34 (see FIG. 2(C)). In this case, the polymerization is basically conducted only by light exposure and in principle, does not require heat management whose control is difficult. The second photo-setting component of the present embodiment can also impart transparency to the mold 30 on photopolymerization. When the mold 30 becomes transparent, alignment of the mold 30 on the back plate 12 is easily controlled. Irradiation of the photosensitive paste 32 with light can be conducted simultaneously from both surfaces via not only the back plate 12 but also the mold 30. As a result, light can sufficiently reach the first photo-setting initiator and first photo-setting component, which exist in the depths of the concave portion 28, and the unreacted first photo-setting component does not remain at the free end of the molded article 34. Furthermore, a substantially uniform mechanical strength is afforded to the molded article 34.

Light having a sufficient intensity is required to form the rib without causing defects. When the intensity of light is weak, the set molded article 34 causes cracking during the calcining process. For example, when 40 W straight pipe fluorescent lamp manufactured by Philips Co. are arranged with a distance of 7 cm on the plane, it is necessary that the back plate 12 is arranged with a distance shorter than at least 30 cm from the plane and light is irradiated. Regarding the rib 16 molded by irradiating with light from the distance longer than that described above, severe cracking can be found in the rib after the calcination.

The amount of the first photo-setting initiator also becomes important conditions for forming the rib without causing defects When the amount of the first setting initiator is too small, the molded article 34 causes cracking during the calcining process. The amount of the first photo-setting initiator is not less than 0.1%, and preferably not less than 0.5%, based on the weight of the first setting component.

Light to be irradiated has a comparatively long wavelength and is absorbed only in the first photo-setting initiator. Therefore, light is not substantially absorbed, by the second photo-setting initiator, and only the polymerization of the first photo-setting component is initiated to obtain the molded article 34. As a result, even if the unreacted second photo-setting component is remained in the mold 30, it is possible to inhibit the unreacted second photo-setting component from reacting with the first photo-setting component. That is, the molded article 34 is capable of avoiding adhesion to the mold 30 by photopolymerization.

Figure 2D:
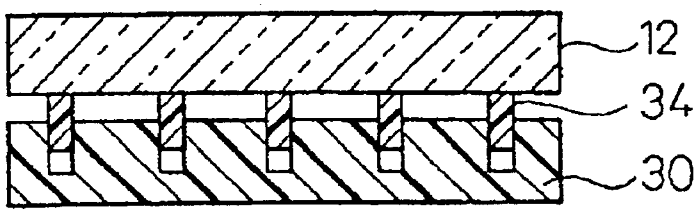

Then, the molded article 34 is removed from the mold 30, thereby transferring the molded article 34 integrally to the back plate 12 (see FIG. 2(D)). As mentioned above, adhesion of the molded article 34 to the mold 30 is avoided. Accordingly, such removal can be easily conducted without causing breakage of the back plate 12 or molded article 34 or its free end, which may be left in the mold 30. As a result, it becomes possible to repeatedly use the mold 30 without being washed, thereby making it possible to improve the productivity of the substrate for PDP.

Figure 2E:
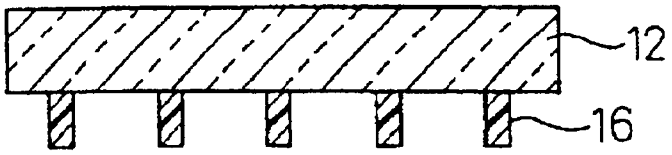

Then, both of the molded article 34 and back plate 12 are put in a calcining oven (not shown) and calcined at a predetermined temperature to obtain a rib 16 (see FIG. 2(E)). Before and after this calcination, retention of the network mentioned above is substantially made, thereby reducing shrinkage of the molded article. Accordingly, it is possible to make a rib corresponding to the shape of the concave portion with good accuracy.

If necessary, an address electrode may be formed between ribs on the back plate, and a fluorescent layer may be provided on the address electrode. Then, a transparent front plate, on which a bus electrode has previously been formed, may be disposed to face with the back plate via a rib. Furthermore, the peripheral portions of the front plate and back plate may be sealed in an air-tight manner by using a sealing material, thereby forming a discharge display cell between the front plate and back plate. After evacuating the discharge display cell, a discharge gas may be introduced into the discharge cell to make a substrate for PDP.

When an address electrode is formed between ribs on the back plate, it is necessary that a pitch of the address electrode on the back plate and that of the concave portion for forming a rib of the mold are adjusted each other. The thermal expansion coefficient of the mold 30 of the present invention is generally $1.5\times10^{-5}$ to $3.5\times10^{-5}/°$ C., while the thermal expansion coefficient of the back plate is generally $0.8\times10^{-5}$ to $0.9\times10^{-5}/°$ C. Therefore, when pitches of the both at room temperature are different, pitches of the both can be adjusted by controlling the temperature utilizing a difference in thermal expansion coefficients of the both.

FIG. 3 is a flow sheet showing the second embodiment of the method of producing the substrate for PDP according to the present invention. In the drawing, the details of the concave portion for forming a rib on the mold 30, are omitted.

Figure 3A:
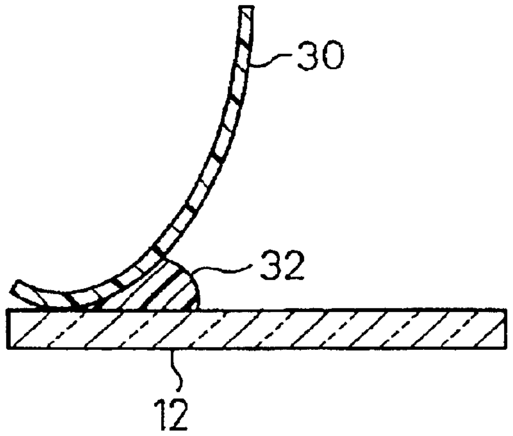
FIGS. 3A–3E provide a flow sheet showing the second embodiment of the method of producing the substrate for PDP according to the present invention.
Figure 3B:
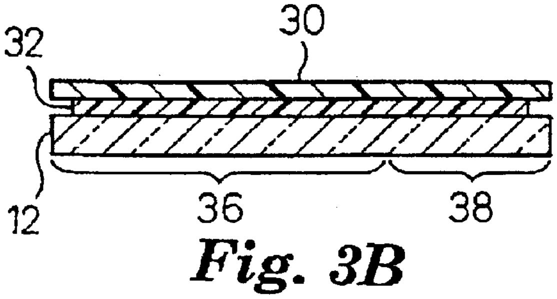
Figure 3C:
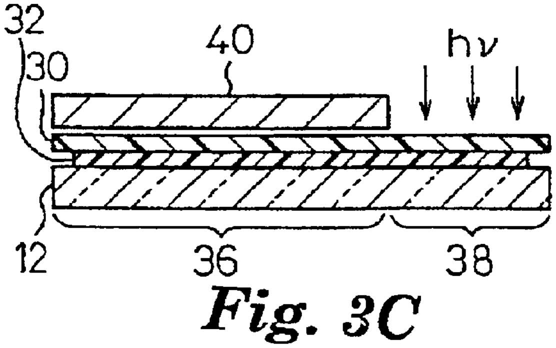

According to this embodiment, prior to irradiation of the rib precursor composition 32 with light having a wavelength longer than that corresponding to the second absorption edge, the rib precursor composition 32 filled in the peripheral portion of the back plate 12 requiring no rib 16 is irradiated with light ($hv_1$) having a wavelength shorter than that corresponding to the second absorption edge, before being irradiated with light having a wavelength longer than that corresponding to the second absorption edge, as shown by the arrow in FIG. 3(C). According to this embodiment, the rib molded article 34 are adhered to the mold 30 by the photo-setting reaction between the second setting component in the mold 30 and the first setting component in the rib precursor composition 32, and thus the rib molded article 34 at the peripheral portion of the back plate 12 is removed together with the mold 30, in the step of removing the mold 30. Therefore, a step of removing the rib molded article 34 at the peripheral portion of the back plate 12 is not required. Irradiation with light is preferably conducted from the side of the mold 30. When it is conducted from the side of the back plate 12, the rib molded article 34 is not only adhered to the mold 30, but also to the back plate 12. On irradiation with light, a light screen mask 40 may also be used to prevent irradiation of light into the center portion of the mold 30, if necessary.

In such a way, when the unreacted second setting component is remained at the peripheral portion of the mold 30, the second photo-setting initiator absorbs light by irradiation with light ($hv_1$), to cause the setting reaction between the second setting component in the mold 30 and the first light-setting component in the rib precursor composition 32. That is, at the peripheral portion of the back plate 12 irradiated with light ($hv_1$), the molded article 34 and mold 30 are adhered each other at the peripheral portion by photopolymerization. Therefore, the rib molded article 34 filled in the peripheral j portion of the back plate 12 can be easily removed from the back plate 12, together with the mold 30.

To avoid that light coming from the mold 30 reflects from the back plate 12 to irradiate the rib precursor composition 32 from the side of the back plate 12, a coating composition or a film, which absorb light ($hv_1$), may be laminated on the back surface of the back plate 12.

Figure 3D:
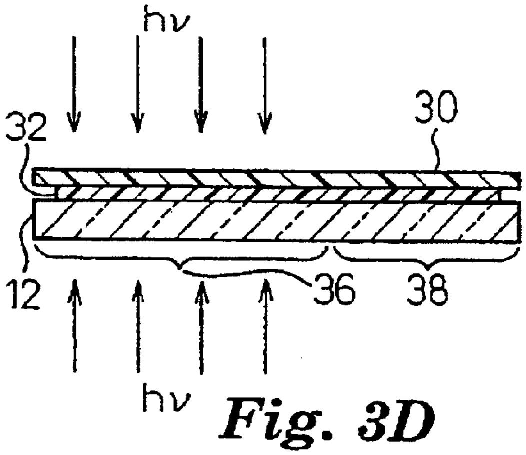

Subsequently, the rib precursor composition 32 filled in the center portion of the back plate 12, where the rib 16 is to be formed, is irradiated with light ($hv_2$) having a wavelength longer than that corresponding to the second absorption edge, as shown in FIG. 3(D). Transparency is imparted to this mold 30 by photopolymerization of the photo-setting component, thereby making it possible to irradiate the rib precursor composition 32 with light from both sides through not only by the back plate 12, but also the mold 30. As a result, light can sufficiently reach the first setting component and first photo-setting initiator, which exist in the depths of the concave portion 28, thereby imparting substantially uniform mechanical strength to the molded article 34.

Figure 3E:
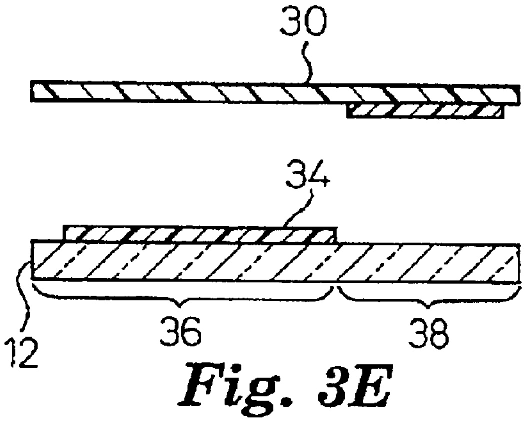

Preferred light to be irradiated is light, that has comparatively long wavelength and is absorbed only by the first setting initiator in the rib precursor composition 32, and which is not substantially absorbed by the second setting initiator of the mold 30. In this case, even if the unreacted second setting component is remained in the mold 30, it does not react with the first setting component in the rib precursor composition 32. Accordingly, it is possible to prevent the molded article 34 from adhering to the mold 30 as a result of photopolymerization. In this case, the rib molded article 34 filled in the peripheral portion of the back plate 12 may also be irradiated with light ($hv_2$), because this portion has already been set by irradiation with light ($hv_1$). Thereafter, in case where the mold 30 is removed form the back plate 12, when the molded article 34 is removed, the rib molded article 34 at the peripheral portion of the back plate 12 is removed from the back plate 12, together with the mold 30, thereby forming a rib 16 integrally with the back plate 12 only at the center portion, as shown in FIG. 3(E).

It is preferred that the molded article 34 is not adhered to the peripheral portion of the back plate 12. Because the front plate 14 and back plate 12 are usually laminated by coating a sealing material (not shown) at the peripheral portion of the back plate 12. Alternatively, the peripheral portion of the back plate 12 is sometimes provided with an electrode terminal for electrically connecting with the exterior (not shown). Accordingly, when the rib precursor composition 32 is extruded out to the peripheral portion of the back plate 12 to form a molded article 34, the molded article 34 at this portion must be removed. Usually, the molded article 34 at the peripheral portion of the back plate 12 may be removed by using a scraper. In this case, however, there is a fear that an electrode terminal existing in the vicinity is damaged. The rib precursor composition 32 filled in the peripheral portion of the mold 30 can also be removed without setting. However, there is a fear that the unset rib precursor composition 32 flows when removing the mold 30, resulting in contact with the molded article 34.

In this embodiment, it becomes impossible to repeatedly use the mold 30, but removal of the molded article 34 formed at the peripheral portion of the back plate 12 can be efficiently conducted without damaging the electrode terminal or bringing the unreacted rib precursor composition into contact with the molded article 34.

EXAMPLES

Example 1

In this example, a photosensitive paste was prepared in the following procedure. First, 10 g of a bisphenol A diglycidyl ether methacrylic acid adduct (manufactured by Kyoei-sha Kagaku Co.) and 10 g of triethylene glycol dimethacrylate (manufactured by Wako Pure Chemical Industries Co.) were mixed to prepare a first photo-setting component. To this first photo-setting component, 0.2 g of a first photo-setting initiator of bis(2,4,6-trimethylbenzoyl) phenylphosphine oxide commercially available from Ciba Geigy Co. under the trade name of Irgacure 819, 20 g of 1,3-butanediol as a diluent, 0.2 g of phosphate propoxyalkyl polyol (POCA) as a surfactant and 0.1 g of Dappo SN357 (Sunnopco Co.) as an antifoamer were added. 80 g of a mixed powder (RFW-030) of lead glass ($PbO—B_2O_3—SiO_2$) commercially available from Asahi Glass Co. and an inorganic oxide was dispersed in this solution. After the completion of the dispersion, the resulting paste were charged in a glass container and evacuation was conducted by using a vacuum pump to remove bubbles in the paste. In this case, the bubbles could be efficiently removed by heating the paste to about 60° C.

Then, a mold having a concave portion corresponding to the shape of a rib was prepared. This mold was formed from a second photo-setting component in the presence of 1% by weight of a second photo-setting initiator. As the second photo-setting component, an aliphatic urethane acrylate oligomer commercially available from Henschel Co. under the trade name of Photomer 6010 was used. As the second photo-setting initiator, 2-hydroxy-2-methyl-1-phenyl-propan-1-one commercially available from Ciba Geigy Co. under the trade name of Dalocure 1173 was used. This initiator has an absorption edge whose wavelength corresponds to that of 380 nm. Photopolymerization of the second photo-setting component was conducted by irradiating with light having a wavelength of 300 to 400 nm using a fluorescent lamp manufactured by Mitsubishi Electric OSRAM Ltd.

The space between the concave portion of the mold made as described above and the back plate was filled with the above photosensitive paste. Then, photopolymerization of the first photo-setting component was conducted by irradiating with light having a wavelength of 400 to 500 nm for 3 minutes, using a fluorescent lamp manufactured by Philips Co. This irradiation with light was conducted simultaneously from both sides of the transparent mold and transparent base (back plate). Then, a molded article was removed from the mold, together with the back plate. Removal of the molded article could be easily conducted without damaging the molded article and the back plate. No damage of the mold and no retention of the molded article in the mold were observed, and thus it was found that the mold can be used repeatedly.

Example 2

In this example, a photosensitive paste was prepared in the following procedure. First, 10 g of a bisphenol A diglycidyl ether methacrylic acid adduct (manufactured by Kyoei-sha Kagaku Co.) and 10 g of triethylene glycol dimethacrylate (manufactured by Wako Pure Chemical Industries Co.) were rixed to prepare a first photo-setting component. To this first photo-setting component, 0.2 g of a first phot-setting initiator of bis(2,4,6-trimethylbenzoyl)-phenylphosphine oxide commercially available from Ciba Geigy Co. under the trade name of Irgacure 819, 20 g of 1,3-butanediol as a diluent, 0.2 g of phosphate propoxyalkyl polyol (POCA) as a surfactant and 0.1 g of Dappo SN357 (Sunnopco Co.) as an antifoamer were added. 80 g of a mixed powder (RFW-030) of lead glass ($PbO—B_2O_3—SiO_2$) commercially available from Asahi Glass Co. and an inorganic oxide was dispersed in this solution. After the completion of the dispersion, the resulting paste were charged in a glass container and evacuation was conducted by using a vacuum pump to remove bubbles in the paste. In this case, the bubbles could be efficiently removed by heating the paste to about 60° C.

Then, the space between the concave portion of the mold made and the back plate was filled with the above photosensitive paste. After masking the center portion of the mold with a light screen mask, the photosensitive paste filled in the peripheral portion of the mold through the mold was irradiated with light having a wavelength of 300 to 400 nm, using a fluorescent lamp manufactured by Mitsubishi Electric OSRAM Ltd. for 2 minutes. After removing the light screen mask, photopolymerization of the first photo-setting component was conducted by irradiating with light having a wavelength of 400 to 500 nm for 1 minute, using a fluorescent lamp manufactured by Philips Co. This irradiation with light was conducted simultaneously from both sides of the transparent mold and transparent base (back plate). Then, a molded article was removed from the mold, together with the back plate. At this time, a molded article was transferred to the center portion of the back plate. On the other hand, the molded article was not transferred to the peripheral portion of the back plate, but was adhered to the peripheral portion of the mold. That is, the molded article at the peripheral portion of the back plate could be removed from the back plate, together with the mold.

Example 3

A photosensitive paste was prepared in the following procedure. First, 24 g of γ-methacryloxypropylmethyldimethoxysilane (manufactured by Nippon Unicar Co.) as a first photo-setting component was prepared. In addition, 6 g of a mixed solution of an aqueous 0.01 N nitric acid solution and ethanol in a molar ratio of 2:1 was prepared. After these components were mixed and sufficiently stirred, the mixture was reacted by allowing to standing at 70° C. for 12 hours. Then, the reaction product was dried at 70° C., and water and alcohol were removed by evaporation.

To this liquid, 8 g of 2-hydroxyethyl methacrylate (manufactured by Wako Pure Chemical Industries Co.) was added to prepare a first setting component. Furthermore, 8 g of 1,3-butanediol (Wako Pure Chemical Industries Co.) as a diluent, 0.3 g of Irgacure 819 manufactured by Ciba Geigy Co. as a first photo-setting initiator, 0.2 g POCA (phosphate propoxyalkyl polyol) as a surfactant and 0.1 g of Dappo SN357 (Sunnopco Co.) as an antifoamer were added. Furthermore, 70 g of an α-alumina having an average particle diameter of 2.1 μm (AL-45-2, manufactured by Showa Denko Co.) was dispersed to obtain a photosensitive paste. Furthermore, the bubbles were removed in the same manner as in Example 1.

The space between the concave portion of the mold made in Example 1 and the back plate was filled with the above photosensitive paste. After masking the center portion of the mold with a light screen mask, the photosensitive paste filled in the peripheral portion of the mold through the mold was irradiated with light having a wavelength of 300 to 400 nm, using a fluorescent lamp manufactured by Mitsubishi Electric OSRAM Ltd. for 2 minutes. After removing the light screen mask, photopolymerization of the first photo-setting component was conducted by irradiating with light having a wavelength of 400 to 500 nm for 1 minute, using a fluorescent lamp manufactured by Philips Co. This irradiation with light was conducted simultaneously from both sides of the transparent mold and transparent base (back plate). Then, a molded article was removed from the mold, together with the back plate. At this time, a molded article was transferred to the center portion of the back plate. On the other hand, the molded article was not transferred to the peripheral portion of the back plate, but was adhered to the peripheral portion of the mold. That is, the molded article at the peripheral portion of the back plate could be removed from the back plate, together with the mold.

Comparative Example 1

In this example, a molded article was made in the same manner as in Example 1, except that the peripheral portion of the mold was irradiated with light having a wavelength of 300 to 400 nm through the back plate using a fluorescent lamp manufactured by Mitsubishi Electric OSRAM Ltd., and the mold was removed. The molded article was lightly adhered to the mold. As a result, the molded article could not be peeled from the mold together with the back plate. Even if the molded article was peeled off, it was broken.

Comparative Example 2

In this example, a molded article was prepared and the mold was removed as described in example 2, except that a light having a wavelength of 300–400 nm was irradiated only through the back plate but not through the mold, using a fluorescent lamp manufactured by Mitsubishi Electric OSRAM Ltd. In this case, the molded article was peeled off from the mold and transferred to the base (back plate) at the center portion of the back plate. On the other hand, at the peripheral portion of the back plate, the molded article was tightly adhered to both the mold and the base, and thus the molded article could not be peeled off satisfactory. Further, even if the molded article is peeled off, it was broken. That is, it was impossible to remove the molded article at the peripheral portion of the back plate, together with the mold.

EFFECT OF THE INVENTION

According to the method of producing the substrate for PDP of the present invention, breakage of the base and rib is avoided and the mold can be repeatedly used. According to the method of producing the substrate for PDP of the present invention, by irradiating the rib precursor composition with light whose wavelength is shorter than that corresponding to the second absorption edge, necessity of the step of removing the rib molded article or rib precursor composition at the peripheral portion of the base can be eliminated.

What is claimed is:

1. A method of producing a substrate for a plasma display panel, which comprises the steps of:

providing a mold having a concave portion and comprising an unreacted photo-setting component;

disposing a photo-settable rib precursor composition between a base and the concave portion of the mold;

irradiating one or more selected areas of the mold to react the rib precursor with the unreacted photo-setting component of the mold, thereby adhering the rib precursor to the mold in the selected areas;

setting the remaining rib precursor not residing within the selected areas wherein the step of setting the remaining rib precursor comprises irradiating using a second wavelength that is longer than a first wavelength used to irradiate the selected areas of the mold; and removing the mold and the rib precursor in the selected areas adhered to the mold.

2. The method according to claim 1, wherein the base and mold are transparent to the second wavelength, and irradiation of the remaining rib precursor composition is conducted through the base and the mold.

3. The method according to claim 1, wherein the one or more selected arcas comprises a periphery of the mold.

4. The method according to claim 1, wherein the step of irradiating one or more selected areas of the mold further comprises masking the unselected area or areas of the mold.

* * * * *

UNITED STATES PATENT AND TRADEMARK OFFICE

CERTIFICATE OF CORRECTION

PATENT NO. : 6,878,333 B1 
DATED : April 12, 2005
INVENTOR(S) : Yokoyama, Chikafumi It is certified that error appears in the above-identified patent and that said Letters Patent is hereby corrected as shown below:

Column 1,
Line 44, after “itself” insert -- . --.
Line 52, delete “(KOKA1)” and insert -- (KOKAI) --, therefor.

Column 3,
Line 4, delete "ac.” and insert -- a.c. --, therefor.

Column 4,
Line 59, delete "5 im” and insert -- 5 µm --, therefor.

Column 5,
Line 43, delete "Co” and insert -- Co. --, therefor.

Column 6,
Line 9, delete "irpacure” and insert -- irgacure --, therefor.

Column 7,
Line 19, after "Furthermore,” delete “a”.

Column 8,
Line 66, after "peripheral,” delete “j”.

Signed and Sealed this

Seventh Day of June, 2005

JON W. DUDAS
*Director of the United States Patent and Trademark Office*